US008472287B1

(12) United States Patent
Isogai et al.

(10) Patent No.: US 8,472,287 B1
(45) Date of Patent: Jun. 25, 2013

(54) THERMALLY-ASSISTED MAGNETIC RECORDING HEAD HAVING A GROOVE FOR INSERTING INTO SUSPENSION

(75) Inventors: Makoto Isogai, Tokyo (JP); Kosuke Tanaka, Tokyo (JP); Daisuke Miyauchi, Tokyo (JP); Susumu Aoki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 13/402,128

(22) Filed: Feb. 22, 2012

(51) Int. Cl.
*G11B 11/00* (2006.01)

(52) U.S. Cl.
USPC .................................. 369/13.33; 369/13.13

(58) Field of Classification Search
USPC ........ 369/13.33, 13.13, 13.32, 13.02, 112.09, 369/112.14, 112.21, 112.27, 300; 360/59; 29/603.07–603.27; 385/129, 31, 88–94; 250/201.3, 201.5
See application file for complete search history.

(56) References Cited

U.S. PATENT DOCUMENTS

| 7,538,978 | B2 | 5/2009 | Sato et al. | |
|---|---|---|---|---|
| 2005/0190682 | A1* | 9/2005 | Gage et al. | 369/112.29 |
| 2005/0213436 | A1 | 9/2005 | Ono et al. | |
| 2008/0056073 | A1 | 3/2008 | Shimizu | |
| 2008/0192376 | A1* | 8/2008 | Tanaka et al. | 369/13.33 |
| 2009/0266789 | A1* | 10/2009 | Shimazawa et al. | 216/22 |
| 2010/0085846 | A1* | 4/2010 | Shimazawa et al. | 369/13.33 |
| 2011/0128827 | A1* | 6/2011 | Shimazawa et al. | 369/13.33 |
| 2011/0157738 | A1* | 6/2011 | Shimazawa et al. | 369/13.33 |
| 2011/0188356 | A1* | 8/2011 | Hirata et al. | 369/13.33 |
| 2012/0044790 | A1* | 2/2012 | Shimazawa et al. | 369/13.32 |

FOREIGN PATENT DOCUMENTS

| JP | 4-81806 | 3/1992 |
|---|---|---|
| JP | 2001-357508 | 12/2001 |

OTHER PUBLICATIONS

U.S. Appl. No. 13/402,318, filed Feb. 22, 2012, Hirata, et al.
U.S. Appl. No. 12/860,349, filed Aug. 20, 2010, Unknown.
Robert E. Rottmayer, et al., "Heat-Assisted Magnetic Recording", IEEE Transactions on Magnetics, Vo. 42, No. 10, Oct. 2006, pp. 2417-2421.

* cited by examiner

*Primary Examiner* — Tan X Dinh
(74) *Attorney, Agent, or Firm* — Oblon, Spivak, McClelland, Maier & Neustadt, L.L.P.

(57) ABSTRACT

A thermally assisted magnetic head includes a suspension mounting arrangement facilitating insertion and positioning of a suspension and hardly causes displacement after insertion. The head further includes a slider and a light source unit. The slider has a recording element, a plasmon generating element, a waveguide and a reproducing element at one of opposite ends in a length direction. The recording element and waveguide are disposed adjacent to the plasmon generating element. The light source unit has a laser diode chip and a holder and is disposed on a back surface of the slider opposite from a medium-facing surface. The chip is supported by the holder and optically connected to the waveguide in a height direction. Further, the slider has a groove in a surface of a trailing-side end face for insertion of a suspension. The groove extends linearly along a width direction with bent parts at opposite open ends.

9 Claims, 13 Drawing Sheets

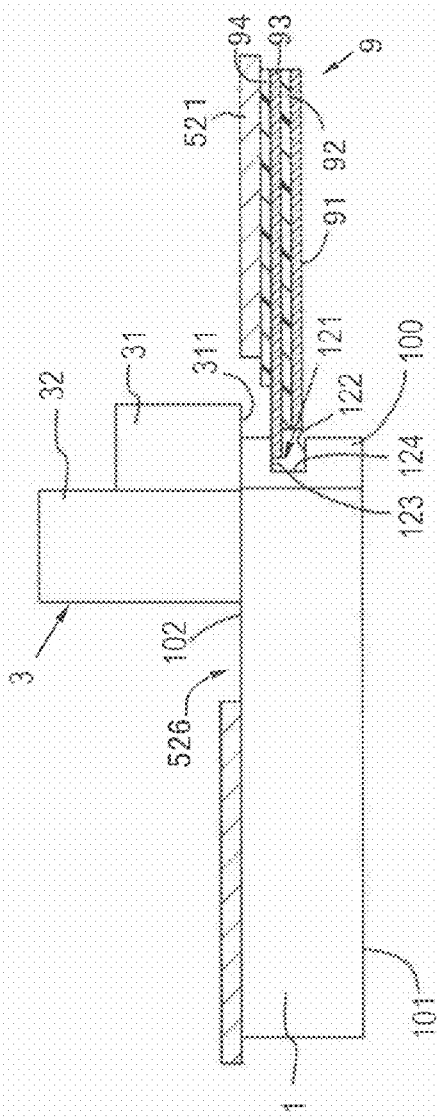
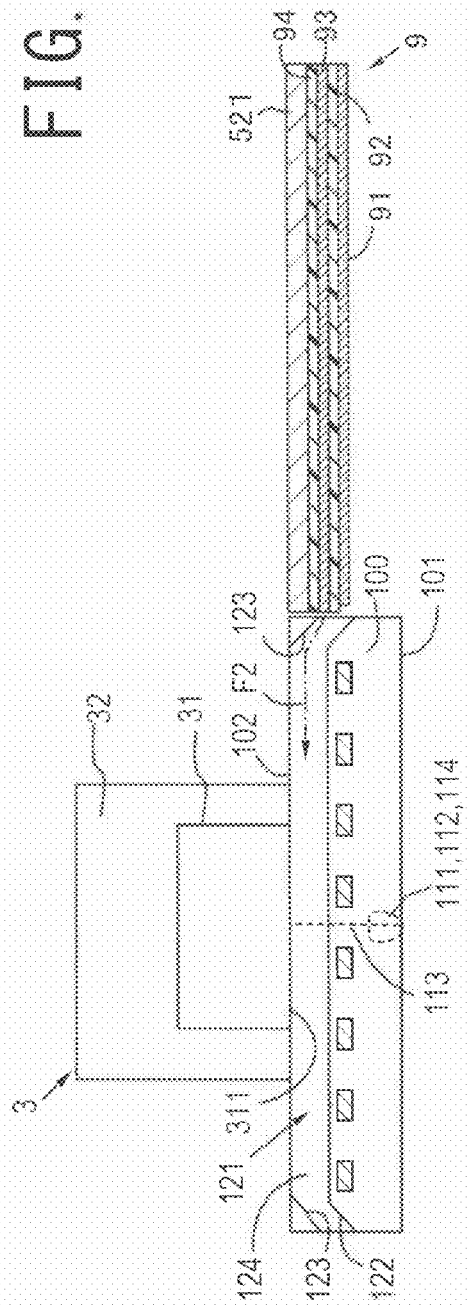

THERMALLY-ASSISTED MAGNETIC RECORDING HEAD HAVING A GROOVE FOR INSERTING INTO SUSPENSION

TECHNICAL FIELD

The present invention relates to a thermally assisted magnetic head, a magnetic head device and a magnetic recording/reproducing apparatus.

BACKGROUND OF THE INVENTION

Further improvement in performance of magnetic heads has been required along with an increase in recording density of magnetic recording/reproducing apparatuses. As magnetic heads, widely used is a composite-type magnetic head having a multilayer structure of a magnetic detecting element such as magneto-resistive (MR) element and a magnetic recording element such as electromagnetic coil element, and with these elements, data signals can be recorded on or read from a magnetic disk that is a magnetic recording medium.

The magnetic recording medium is a sort of discontinuous body of aggregated magnetic fine particles, and each magnetic fine particle has a single-domain structure. It should be noted that each recording bit comprises a plurality of magnetic fine particles. In order to increase the recording density, therefore, irregularities at boundaries of recording bits have to be reduced by reducing the size of the magnetic fine particles. However, reducing the size of the magnetic fine particles causes a problem of decreasing thermal stability of magnetization along with a decrease in volume.

An index of the thermal stability of magnetization is given by KUV/kBT. In this, KU is a magnetic anisotropy energy of the magnetic fine particles, V is a volume of one magnetic fine particle, kB is a Boltzmann constant, and T is an absolute temperature. Reducing the size of the magnetic fine particles means reducing the volume V of the magnetic fine particle, which leads to lowering KUV/kBT to thereby impair the thermal stability.

Although the magnetic anisotropy energy KU may be increased at the same time as measures against this problem, the increase in the magnetic anisotropy energy KU enhances the coercivity of the recording medium. On the other hand, the intensity of a writing magnetic field generated by a magnetic head is substantially determined by the saturated magnetic flux density of a soft magnetic material constituting a magnetic pole within the head. Therefore, no writing can be made if the coercivity exceeds a permissible value determined by the limit of the writing magnetic field intensity.

As a method for solving such a problem in thermal stability of magnetization, proposed is a so-called thermally assisted magnetic recording method in which although a magnetic material having a large magnetic anisotropy energy KU is employed, writing is performed after reducing the coercivity such that heat is applied to a recording medium immediately before application of a writing magnetic field. This method is similar to magneto-optical recording but different in that spatial resolution in the thermally assisted recording depends on magnetic field while spatial resolution in the magneto-optical recording depends on light.

In practice, the magnetic recording medium is typically heated by irradiating the magnetic recording medium with a light such as near-field light. In this method, it is important where and how a high power light source is disposed in the magnetic head so as to stably apply a sufficiently intense light to a desired area of the magnetic recording medium. As for the setting of the light source, for example, U.S. Pat. No. 7,538, 978) discloses a configuration in which a laser unit including a laser diode is disposed on a back surface of a slider, and US Patent Application No. 2008/0056073 A1 discloses a configuration in which a structure of a laser diode element with a monolithically integrated reflection mirror is disposed on a back surface of a slider. Furthermore, US Patent Application No. 2005/0213436 A1 discloses a slider that is formed together with a semiconductor laser, and Robert E. Rottmayer et al. "Heat-Assisted Magnetic Recording" IEEE TRANSACTIONS ON MAGNETICS, Vol. 42, No. 10, p. 2417-2421 (2006) discloses a configuration in which a diffraction grating is irradiated with a light generated from a laser unit provided within a drive apparatus.

In any case, the thermally assisted magnetic head has to be mounted on a suspension. The mounting arrangement of the thermally assisted magnetic head to the suspension may be the one in which a groove is formed in a slider and a flexible part of the suspension is inserted and fixed in the groove. In realizing this arrangement, heretofore, the groove has been formed by machining.

However, grooves that can be realized by machining are limited to those having a simple linear shape. Therefore, it is difficult to precisely insert and position the suspension in the groove. Even if it is precisely inserted and positioned, moreover, it may easily be displaced before fixing. Furthermore, a curved surface due to the shape of a tool or a processing method is left at a position where the bottom surface and the inner side face of the groove meet with each other. This curved surface tends to become an obstacle, causing a problem such as improper insertion or tilt of the suspension.

SUMMARY OF THE INVENTION

It is an object of the present invention to provide a thermally assisted magnetic head whose suspension mounting arrangement facilitates insertion and positioning of a suspension but hardly causes displacement after insertion and a magnetic head device and a magnetic recording/reproducing apparatus (HDD apparatus) using the same.

In order to solve the above problems, a thermally assisted magnetic head according to the present invention comprises a slider and a light source unit. The light source unit is disposed on a back surface of the slider opposite from a medium-facing surface, while the slider has a groove in a surface of a trailing-side end face for insertion of a suspension. The groove extends linearly along a width direction Y with bent parts at opposite open ends, where an airflow direction as seen in the medium-facing surface of the slider is taken as a length direction X, a direction perpendicular thereto is taken as the width direction Y, and a direction perpendicular to both the length direction X and the width direction Y is taken as a height direction Z.

In the thermally assisted magnetic head according to the present invention, as described above, the slider has the groove in the surface of the trailing-side end face for insertion of the suspension, and the groove extends linearly along the width direction Y with the bent parts at its opposite open ends. With this configuration, the suspension can be inserted from one open end of the groove or an upper opening of the groove, which facilitates insertion of the suspension. Moreover, since the groove extends linearly along the width direction Y with the bent parts at its opposite ends, the inserted suspension can be positioned at an inflection point between the linearly extending part and the bent part. Thus, it can be readily positioned and displacement hardly occurs after insertion.

Preferably, the groove has a corner at a meeting point of a bottom surface and an inner wall surface. With this configuration, since displacement due to the shape of the meeting point never occurs before the suspension inserted into the groove reaches the meeting point of the bottom surface and the inner wall surface, i.e., over the entire depth of the groove, a problem such as tilt of the suspension or the like hardly occurs. The groove thus characterized can be formed through a photolithography process.

Moreover, the inner wall surface of the groove may be formed as a slope. Since the groove is narrow, if the suspension is inserted from the upper opening without any slope, the suspension easily hits against the opening edge of the groove, causing a problem such as tearing. In the case where the inner wall surface of the groove is formed as a slope, when the suspension is inserted from the upper opening of the groove, the tip of the suspension can be pressed against and guided along the slope for insertion, which avoids the above-described problem.

As specific elements for the thermally assisted magnetic head, the slider may have a recording element, a plasmon generating element, a waveguide and a reproducing element at one of opposite ends in the length direction X. The recording element is disposed adjacent the plasmon generating element, and the waveguide is disposed adjacent the plasmon generating element.

The light source unit has a laser diode chip and a holder and is disposed on the back surface of the slider opposite from the medium-facing surface. The laser diode chip is supported by the holder and optically connected to the waveguide in the height direction Z.

With this configuration, the plasmon generating element can generate a near-field light with a laser beam transmitted through the waveguide from the laser diode chip.

Moreover, since the slider has the recording element and the plasmon generating element at one of the opposite ends in the length direction X, heat can be applied to a magnetic recording medium with the plasmon generating element immediately before application of a writing magnetic field with the recording element, thereby enabling thermally assisted magnetic recording in which writing is performed while reducing the coercivity of the magnetic recording medium.

Since the light source unit has the laser diode chip and the holder and is disposed on the back surface of the slider opposite from the medium-facing surface, the head can be constructed such that the mounting surface of the holder is perpendicular to the medium-facing surface of the slider, which is suitable for a head manufacturing process. Moreover, since the light source on the holder can be disposed remote from the medium-facing surface of the slider, mechanical shock can be prevented from being directly applied to the laser diode chip during the magnetic recording or reproducing process. Furthermore, characteristic evaluation of the laser diode chip and characteristic evaluation of the holder can be performed independently. Still furthermore, since an optical fiber forming the waveguide does not need an optical pickup lens, both the cost and the number of processes can be reduced.

The present invention also discloses a magnetic head device in which the above thermally assisted magnetic head is combined with a suspension, a magnetic recording/reproducing apparatus (HDD apparatus) in which the above magnetic head device is combined with a magnetic recording medium, and a manufacturing method therefor.

The other objects, constructions and advantages of the present invention will be further detailed below with reference to the attached drawings. However, the attached drawings show only illustrative examples.

BRIEF DESCRIPTION OF THE DRAWINGS

FIG. 11 is a drawing showing how to assemble the magnetic head device shown in FIGS. 1 to 4;

FIG. 12 is a drawing showing how to assemble the magnetic head device shown in FIGS. 1 to 4;

DESCRIPTION OF THE PREFERRED EMBODIMENTS

1. Thermally Assisted Magnetic Head

Figure 1:
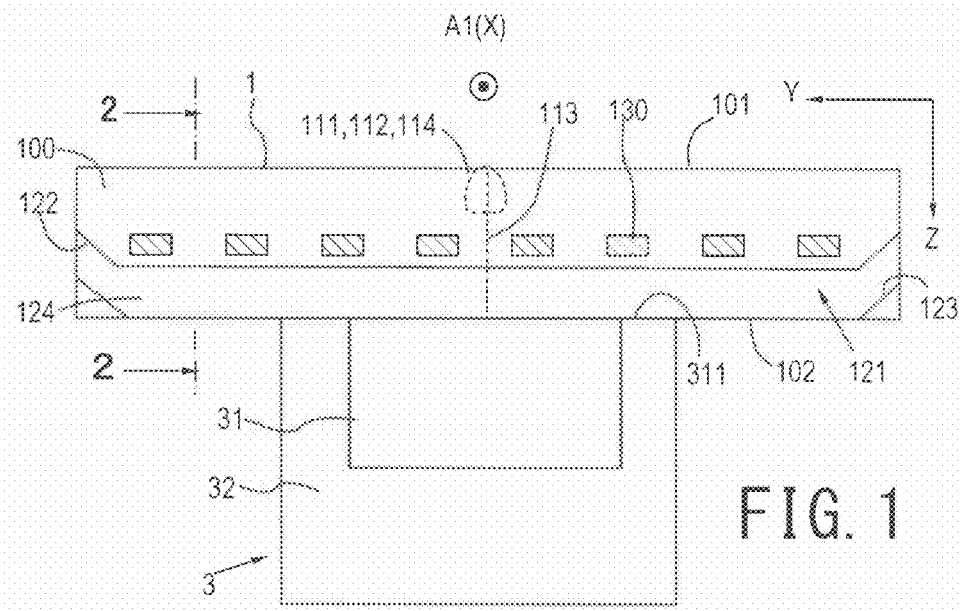
FIG. 1 is a front view of a thermally assisted magnetic head according to the present invention.
Figure 2:
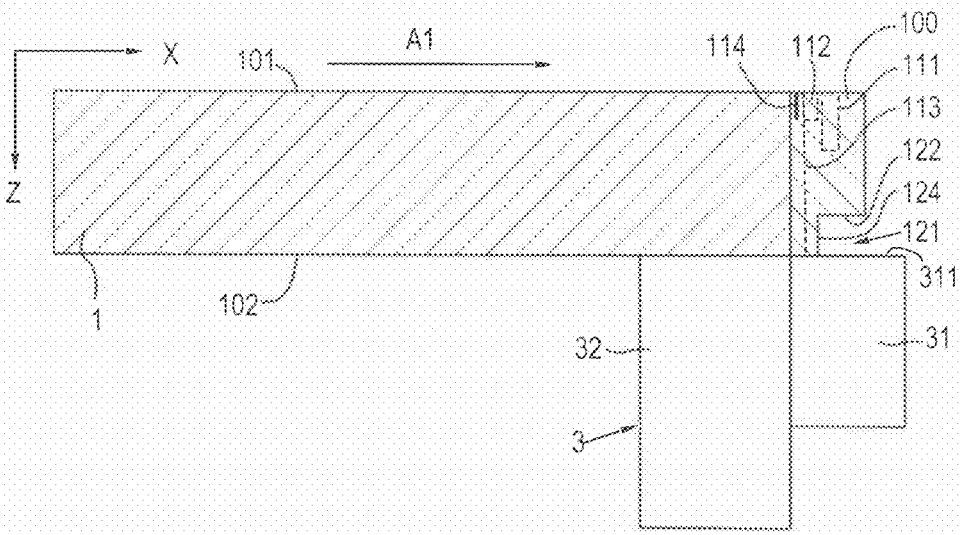
FIG. 2 is a sectional view take along the line 2-2 in FIG. 1.

A thermally assisted magnetic head shown in FIGS. 1 and 2 according to the present invention comprises a slider 1 and a light source unit 3. The slider 1 has a recording element 111, a plasmon generating element 112, a waveguide 113 and a reproducing element 114 at one of opposite ends in a length direction X, where an airflow direction A1 as seen in a medium-facing surface 101 is taken as the length direction X, a direction perpendicular thereto is taken as a width direction Y, and a direction perpendicular to both the length direction X and the width direction Y is taken as a height direction Z. As seen in the airflow direction A1, the end having the recording element 111, the plasmon generating element 112, the waveguide 113 and the reproducing element 114 is located at its trailing side. When the thermally assisted magnetic head is incorporated into an HDD apparatus, the airflow direction A1 coincides with a direction of rotation of a magnetic recording medium.

The slider 1 comprises $Al_2O_3$—TiC or the like. Although omitted from the drawings, the medium-facing surface 101 is geometrically shaped so as to control floating characteristics.

The recording element 111, the plasmon generating element 112, the waveguide 113 and the reproducing element 114 are stacked on the trailing side of the slider 1, which is the side having an air outflow end, by using high-precision patterning technologies including a photolithography process and so on and covered with an insulating protective film 100 such as alumina. Typically, the recording element 111 has a magnetic circuit and a magnetic pole structure suitable for perpendicular magnetic recording.

The plasmon generating element 112 is optically connected to the waveguide 113 for propagating a laser beam and excites surface plasmon so as to generate a near-field light at a near-field light generating end face laying in the medium-facing surface 101. A magnetic recording layer of the magnetic recording medium can be heated by the near-field light.

The recording element 111 is disposed adjacent the plasmon generating element 112 so as to perform magnetic recording on the magnetic recording layer whose coercivity has been lowered by heating with the near-field light. As seen in the airflow direction A1, accordingly, the recording element 111 is located closer to the trailing-side than the plasmon generating element 112.

The reproducing element 114 may be a current-in-plane giant magneto-resistance (CIP-GMR) element, a current-perpendicular-to-plane giant magneto-resistance (CPP-GMR) element or a tunneling magneto-resistance (TMR) element.

The light source unit 3 comprises a laser diode chip (hereinafter referred to as LD chip) 31 and a holder 32 supporting it and is disposed on a back surface 102 of the slider 1 opposite from the medium-facing surface 101 as seen in the height direction Z. The LD chip 31 is optically connected to the waveguide 113 in the height direction Z. The LD chip 31 has a laser diode within. The laser diode may be one capable of emitting a laser beam having a wavelength within the range of 375 nm to 1.7 μm. Specifically, it may be an InP-based, GaAs-based or GaN-based laser diode, for example.

At one end face, the holder 32 is joined to the back surface 102 of the slider 1, for example, through an adhesive. In general, the holder 32 is provided with a monitor for monitoring and controlling the intensity of the laser beam emitted from the laser diode of the LD chip 31 or the like.

In the thermally assisted magnetic head according to the present invention, since the light source unit 3 has the LD chip 31, the LD chip 31 is optically connected to the waveguide 113 in the height direction Z and the waveguide 113 is disposed adjacent the plasmon generating element 112, as described above, the plasmon generating element 112 can generate a near-field light with the laser beam transmitted through the waveguide 113 from the LD chip 31.

Since the slider 1 has the recording element 111 and the plasmon generating element 112 at one of the opposite ends in the length direction X, heat can be applied to a magnetic recording medium with the plasmon generating element 112 immediately before application of a writing magnetic field with the recording element 111, thereby enabling so-called thermally assisted magnetic recording in which writing is performed while reducing the coercivity of the magnetic recording medium.

Since the light source unit 3 has the LD chip 31 and the holder 32 and is disposed on the back surface 102 of the slider 1 opposite from the medium-facing surface 101 as seen in the height direction Z, the head can be constructed such that the mounting surface of the holder 32 is perpendicular to the medium-facing surface 101 of the slider 1, which is suitable for a head manufacturing process. Moreover, since the light source on the holder 32 can be disposed remote from the medium-facing surface 101 of the slider 1, mechanical shock can be prevented from being directly applied to the LD chip 31 during the magnetic recording or reproducing process. Furthermore, characteristic evaluation of the LD chip 31 and characteristic evaluation of the holder 32 can be performed independently. Still furthermore, since an optical fiber forming the waveguide 113 does not need an optical pickup lens, both the cost and the number of processes can be reduced.

In the above configuration, the slider 1 has a groove (or hollow) 121 in the surface of the trailing-side end face for insertion of a suspension. The insulating protective film 100 is disposed at the trailing-side end of the slider 1, and the groove 121 is formed in the surface of the insulating protective film 100. The insulating protective film 100 comprises alumina or the like and covers the recording element 111, the plasmon generating element 112, the waveguide 113, the reproducing element 114 and so on.

The groove 121 is formed in the surface of the insulating protective film 100 in such a manner as to avoid the recording element 111, the plasmon generating element 112, the waveguide 113, the reproducing element 114 and so on and extends linearly along the width direction Y with bent parts at opposite open ends. At the opposite ends in the width direction Y, inner wall surfaces 122, 123 of the groove 121 in FIGS. 1 and 2 are flat slopes ascending from the side of the back surface 102 toward the side of the medium-facing surface 101. Of the inner wall surfaces 122, 123 of the groove 121, the inner wall surface 122 extends over the entire width of the groove 121, but the inner wall surface 123 extends only at the opposite ends of the groove 121 in the width direction Y and does not extend at an intermediate linear part. In the linear part, accordingly, the groove 121 is open at the side opposite to the inner wall surface 122.

In the central area of the part not having the inner wall surface 123 in the width direction Y, an end face 311 of the LD chip 31 is opposed to the inner wall surface 122, thereby forming the groove 121 together with the inner wall surface 122.

On the surface of the insulating protective film 100, a plurality of extraction electrodes 130 are arranged at intervals along the width direction of the groove 121. They can be used as an electrode for the recording element 111 and the reproducing element 114.

The groove 121 may take various forms. Examples will be described with reference to FIGS. 3 and 4. In the drawings, the portions corresponding to the components shown in FIGS. 1 and 2 are denoted by the same reference symbols to avoid duplicated description. In an embodiment of FIG. 3, at first, the groove 121 has only the inner wall surface 122. In the central area in the width direction Y, the end face 311 of the LD chip 31 is opposed to the inner wall surface 122, thereby forming the groove 121 together with the inner wall surface 122. In the central area in the width direction Y, the end face 311 of the LD chip 31 is opposed to the inner wall surface 122, thereby forming the groove 121 together with the inner wall surface 122. This is the same as in the embodiment of FIGS. 1 and 2.

Figure 3:
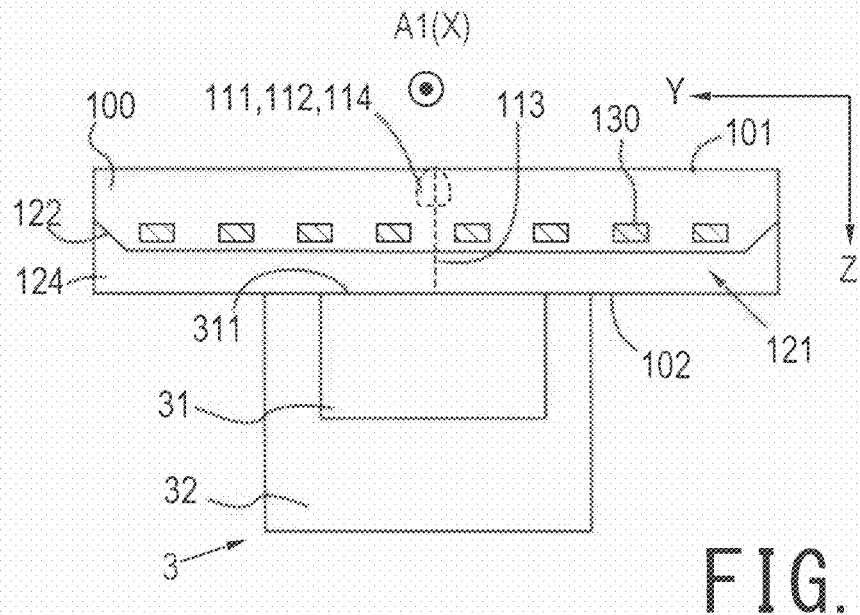
FIG. 3 is a front view showing another embodiment of a thermally assisted magnetic head according to the present invention.
Figure 4:
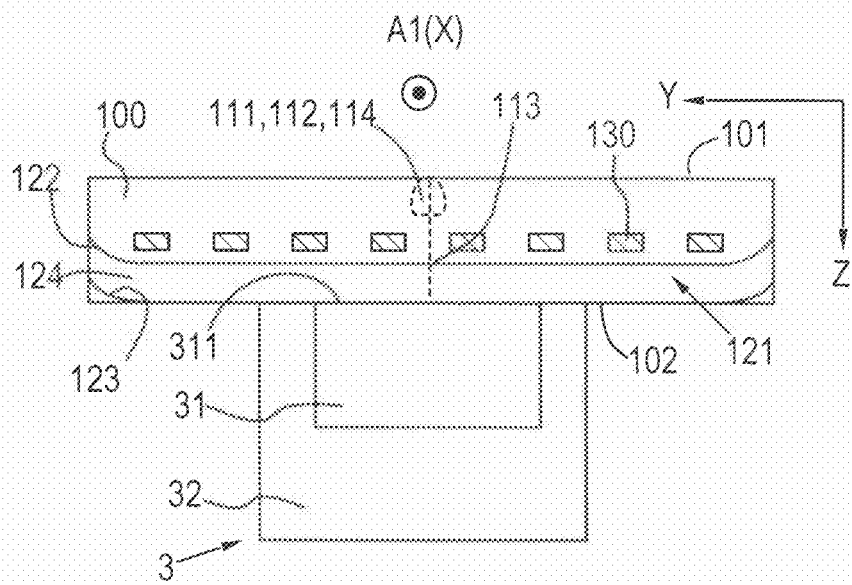
FIG. 4 is a front view showing still another embodiment of a thermally assisted magnetic head according to the present invention.

In an embodiment of FIG. 4, on the other hand, the inner wall surfaces 122, 123 of the groove 121 at the opposite ends in the width direction Y are curved slopes ascending from the side of the back surface 102 toward the side of the medium-facing surface 101. In the central area of the part not having the inner wall surface 123 in the width direction Y, the end face 311 of the LD chip 31 is opposed to the inner wall surface 122, thereby forming the groove 121 together with the inner wall surface 122. This is the same as in the embodiments of FIGS. 1 to 3.

Figure 5:
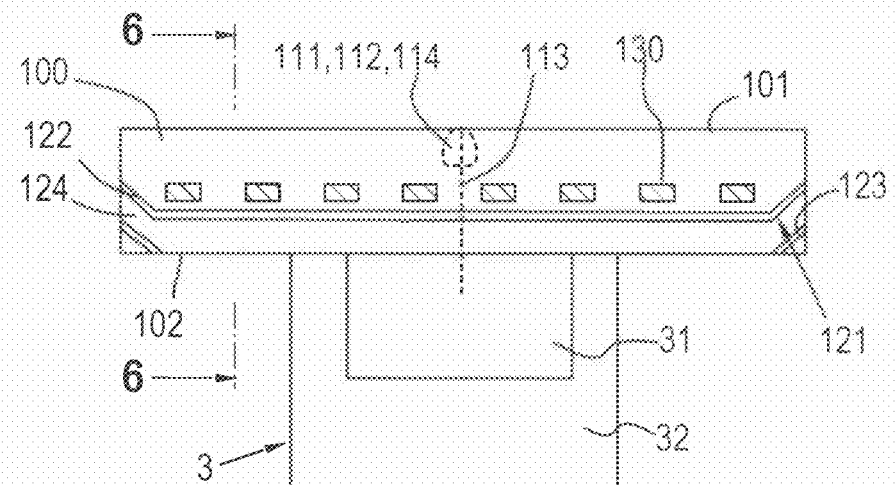
FIG. 5 is a front view showing yet another embodiment of a thermally assisted magnetic head according to the present invention.
Figure 6:
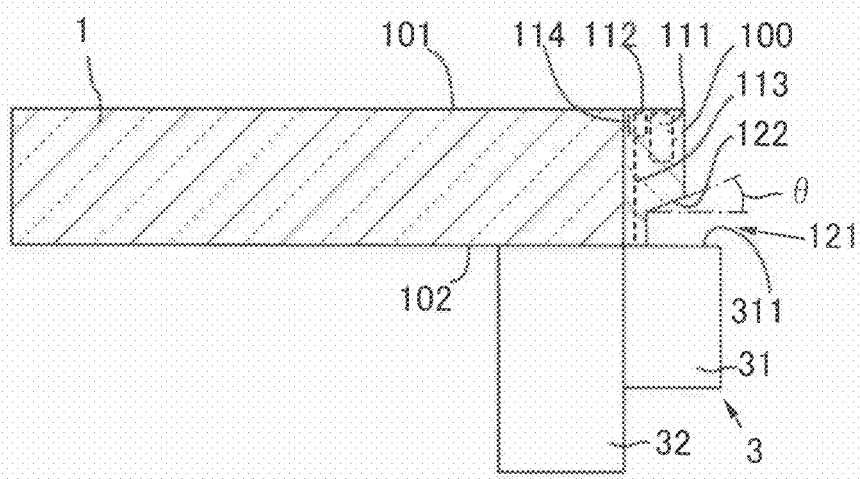
FIG. 6 is a sectional view take along the line 6-6 in FIG. 5.

In an embodiment of FIGS. 5 and 6, moreover, the inner wall surface 122 (or 123) of the groove 121 is a slope inclined at an inclination angle θ. The inclination angle θ is in the range of 0 to 45 degrees, for example.

2. Magnetic Head Device

A magnetic head device incorporating the foregoing thermally-assisted magnetic head will be described below with reference to FIGS. 7 to 10. In the present invention, magnetic head devices include an HGA (head gimbal assembly) in which the magnetic head is mounted on a gimbal and an HAA (head arm assembly) in which the HGA is mounted on an arm.

Figure 7:
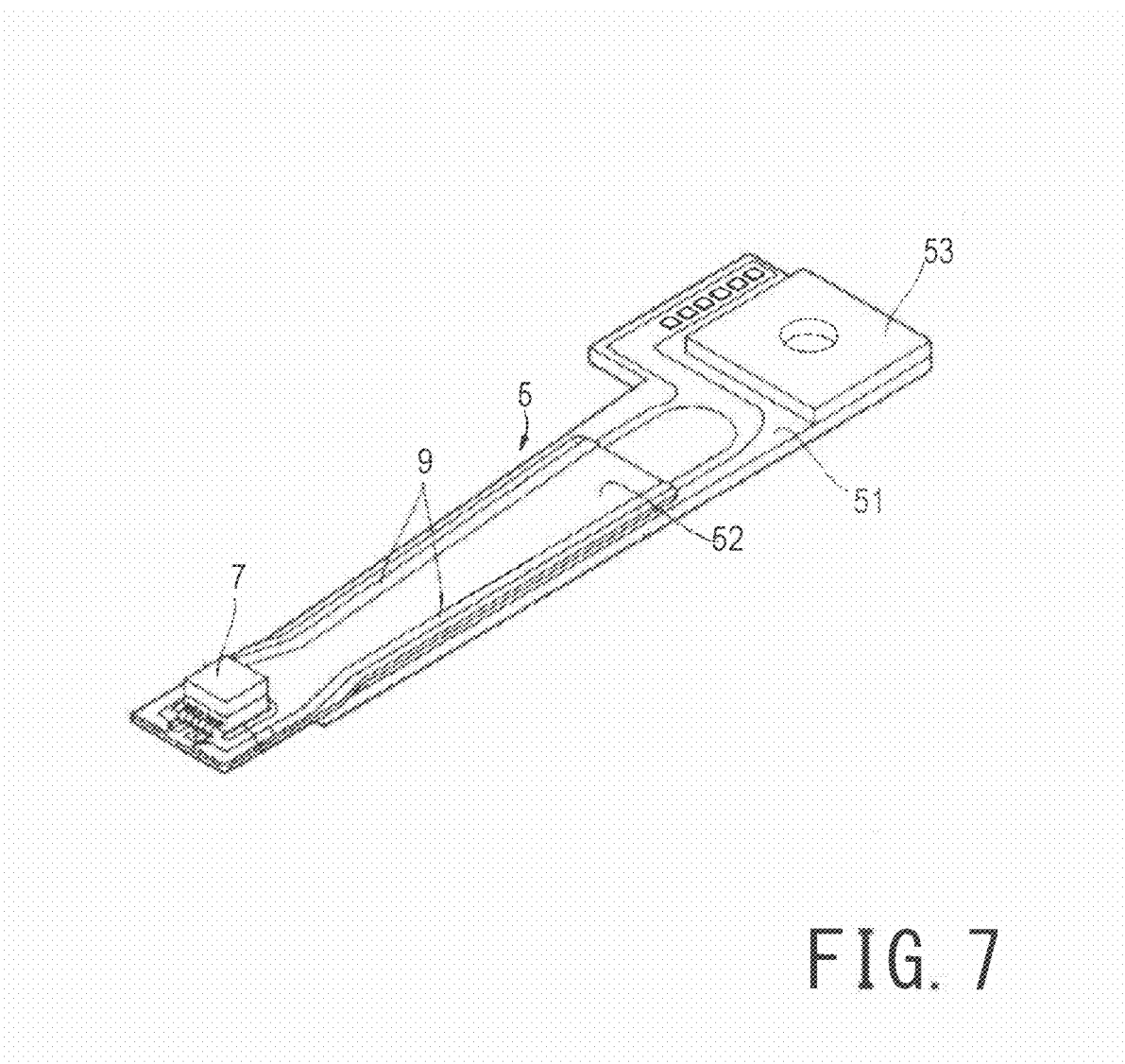
FIG. 7 is a perspective view of a magnetic head device according to the present invention.
Figure 8:
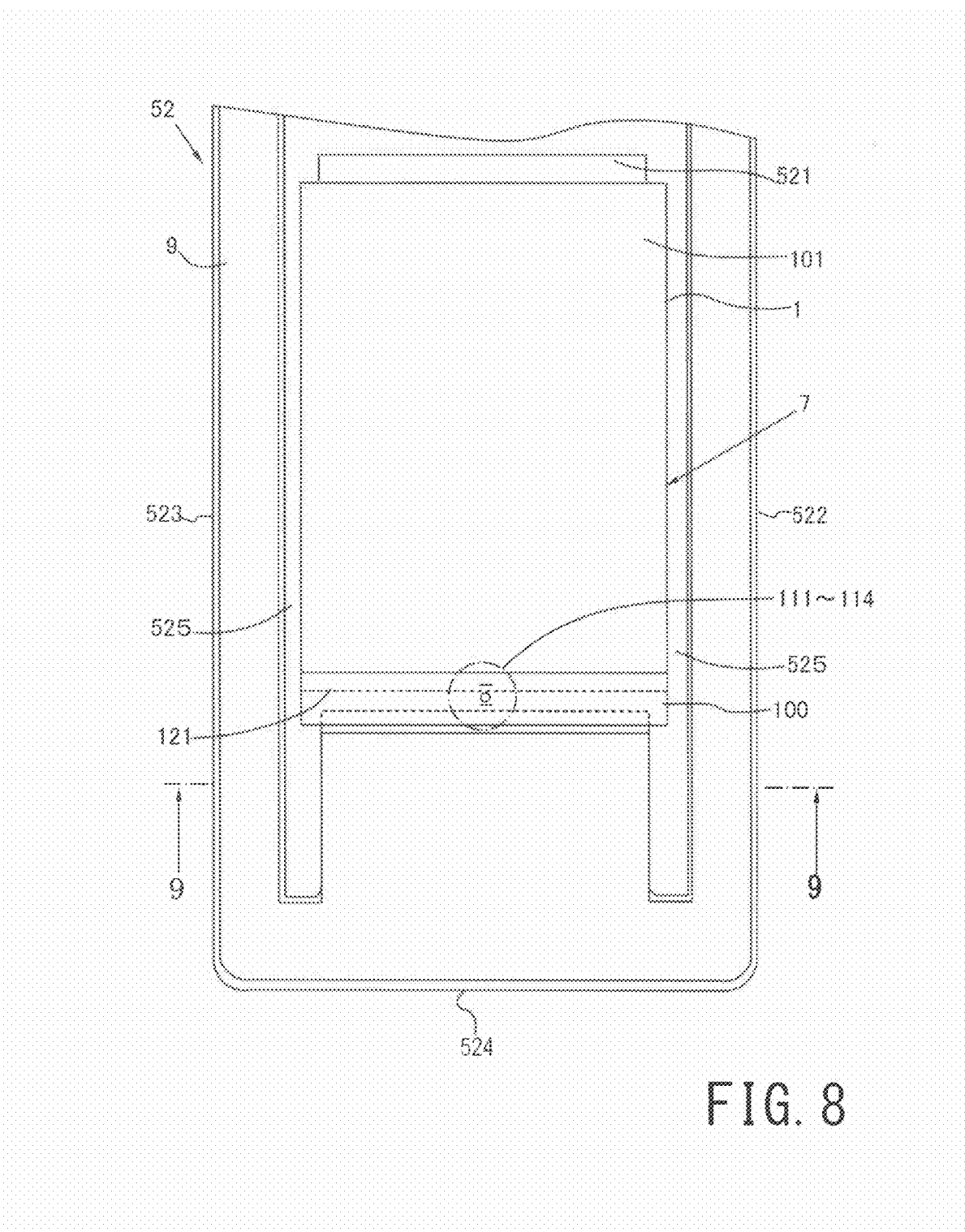
FIG. 8 is a partial enlarged view in which the magnetic head device shown in FIG. 7 is seen from the side of a medium-facing surface.
Figure 9:
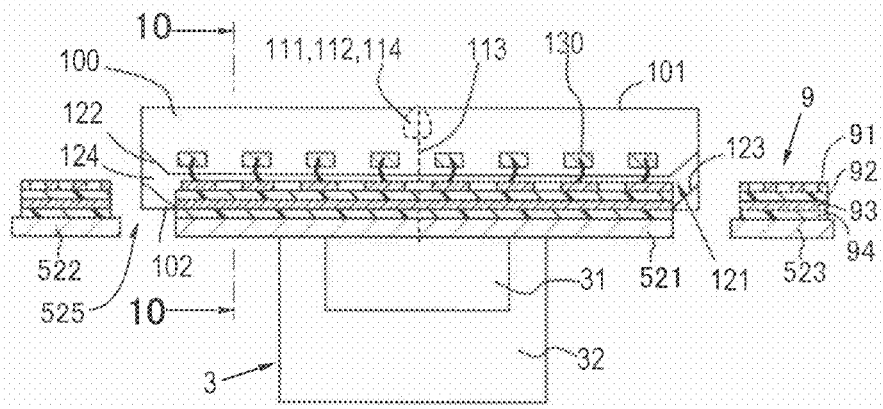
FIG. 9 is a sectional view take along the line 9-9 in FIG. 8.

A magnetic head device shown in FIG. 7 is an HGA including a suspension 5 and a thermally assisted magnetic head 7. The suspension 5 has a load beam 51 and a flexure 52.

The load beam 51 has a load dimple 511 (see FIG. 10) in proximity to a free end on a centrally-extending longitudinal axis and a base 53 on the opposite side. As enlarged in FIGS. 8 to 10, the flexure 52 is formed from a thin leaf spring and subjected to a pressing load from the load dimple 511 with one side thereof attached to one side of the load beam 51 where the load dimple 511 is located. The thermally assisted magnetic head 7 is attached to the other side of the flexure 52.

Figure 10:
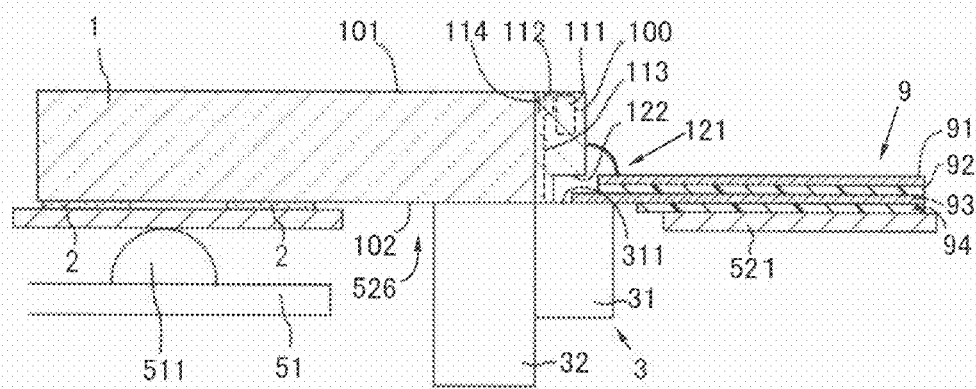
FIG. 10 is a sectional view take along the line 10-10 in FIG. 9.

The flexure 52 has a tongue portion 521 in the center thereof. One end of the tongue portion 521 is connected to outer frame portions 522, 523 through a lateral frame portion 524. Around the tongue portion 521 is formed a groove 525. The back surface 102 of the thermally assisted magnetic head 7 is fixed to one side of the tongue portion 521 by means of an adhesive 2 or the like. As shown in FIG. 10, the tongue portion 521 has a cut-out 526, and the light source unit 3 is passed through the cut-out 526.

Moreover, a flexible cable 9 is disposed on the flexure 52. The flexible cable 9 can be used as a cable for the thermally assisted magnetic head 7. The illustrated flexible cable 9 is a laminate of a first circuit conductor 91 such as Cu, a first polymer film 92, a second circuit conductor 93 such as Cu and a second polymer film 94, wherein the second polymer film 94 is adhered onto the flexure 52 and then led from the flexure 52 toward the load beam 51. Finally, it is connected to a connection terminal disposed at a rear end side of the load beam 51 where the base 53 is located.

The flexible cable 9 forms a part of the suspension together with the flexure 52, wherein its front end extends into the cut-out 526 of the flexure 52 with its tip inserted in the groove 121 formed in the insulating protective film 100. When inserted, the front end of the second circuit conductor 93 is brought into face-to-face contact with the end face 311 of the LD chip 31, while the extraction electrodes 130 formed on the surface of the insulating protective film 100 are connected to the first circuit electrode 91. To the second circuit conductor 93, connected is an electric supply line of the LD chip 31 and the holder 32.

In the thermally assisted magnetic head according to the present invention, as described above, the insulating protective film 100 integrated with the slider 1 has the groove 121 in its trailing-side surface for insertion of the suspension, and the groove 121 extends linearly along the width direction Y with the bent parts at its opposite open ends. With this configuration, the suspension can be inserted from one open end or an upper opening of the groove 121, which facilitates insertion of the suspension.

As shown in FIGS. 11 and 12, for example, the suspension can be readily inserted in any thermally assisted magnetic head shown in FIGS. 1 to 5 because the insertion into the groove 121 can be performed such that, with the light source unit 3 being passed through the cut-out 526 formed in the flexure 52, the second circuit conductor 93 of the flexible cable 9 forming a part of the suspension is introduced from one open end of the groove 121 and guided along the width direction Y in a direction indicated by an arrow F2 (see FIG. 12).

Moreover, since the groove 121 extends linearly along the width direction Y with the bent parts at its opposite ends, the inserted suspension can be positioned at an inflection point between the linearly extending part and the bent part. Thus, it can be readily positioned and displacement hardly occurs after insertion.

In the groove 121, preferably, the bottom surface 124 and the inner wall surface 122, 123 meet at a certain angle. More preferably, the angle formed by the bottom surface 124 and the inner wall surface 122, 123 is substantially 90 degrees. With this configuration, since displacement due to the shape of the meeting point never occurs before the flexible cable 9 inserted into the groove 121 reaches the meeting point of the bottom surface 124 and the inner wall surface 122, 123, i.e., over the entire depth of the groove 121, a problem such as tilt of the suspension or the like hardly occurs. The groove 121 thus characterized can be formed through a photolithography process.

In the thermally assisted magnetic head shown in FIGS. 5 and 6, moreover, the inner wall surface 122 (or 123) of the groove 121 is formed as a slope inclined at an inclination angle θ, so that when this thermally assisted magnetic head is used for the magnetic head device, insertion of the suspension from the upper opening of the groove 121 can be performed smoothly.

More specifically, since the groove 121 is narrow, if the second circuit conductor 93 of the suspension is inserted from the upper opening without any slope, the second circuit conductor 93 easily hits against the opening edge of the groove 121, causing a problem such as tearing.

Figure 13:
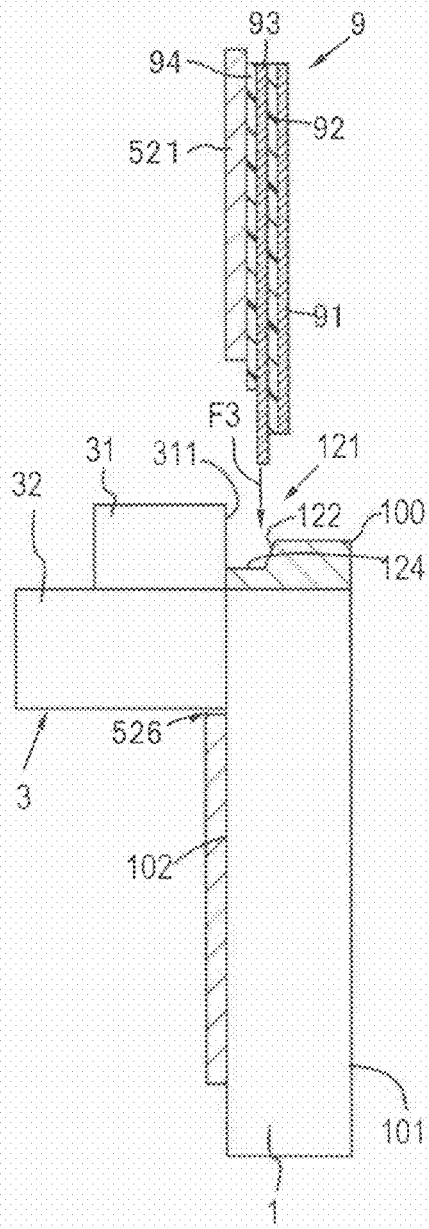
FIG. 13 is a drawing showing how to assemble the magnetic head device shown in FIGS. 5 and 6.
Figure 14:
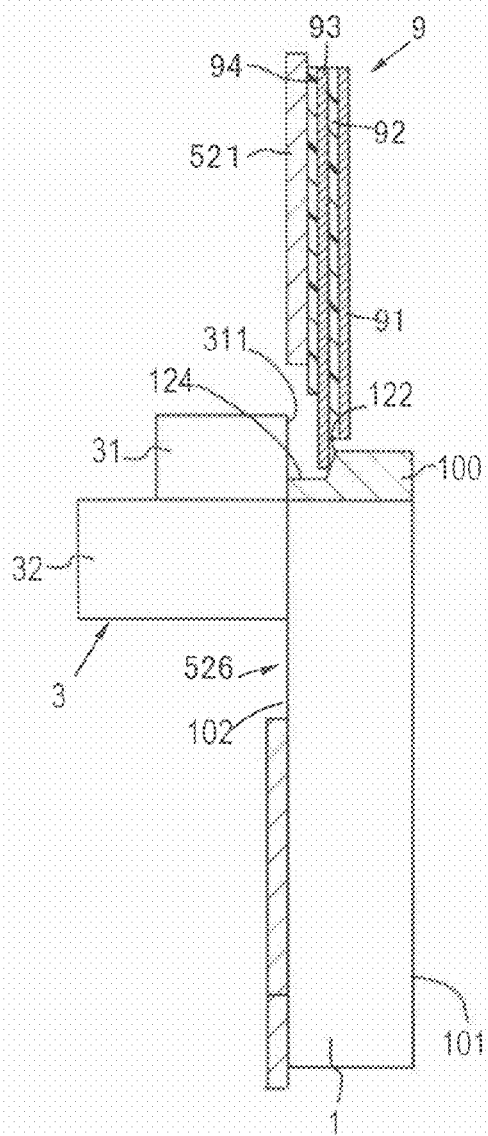
FIG. 14 is a drawing showing how to assemble the magnetic head device shown in FIGS. 5 and 6.

In the case of using the thermally assisted magnetic head of FIGS. 5 and 6 in which the inner wall surface 122 (or 123) of the groove 121 is formed as a slope, on the other hand, when inserting the second circuit conductor 93 of the suspension from the upper opening of the groove 121, the tip of the second circuit conductor 93 of the suspension can be pressed against the inner wall surface 122, which is formed as a slope, and guided along the inner wall surface 122 for insertion, as shown in FIGS. 13 and 14, which avoids the above-described problem.

3. Magnetic Recording/Reproducing Apparatus

Figure 15:
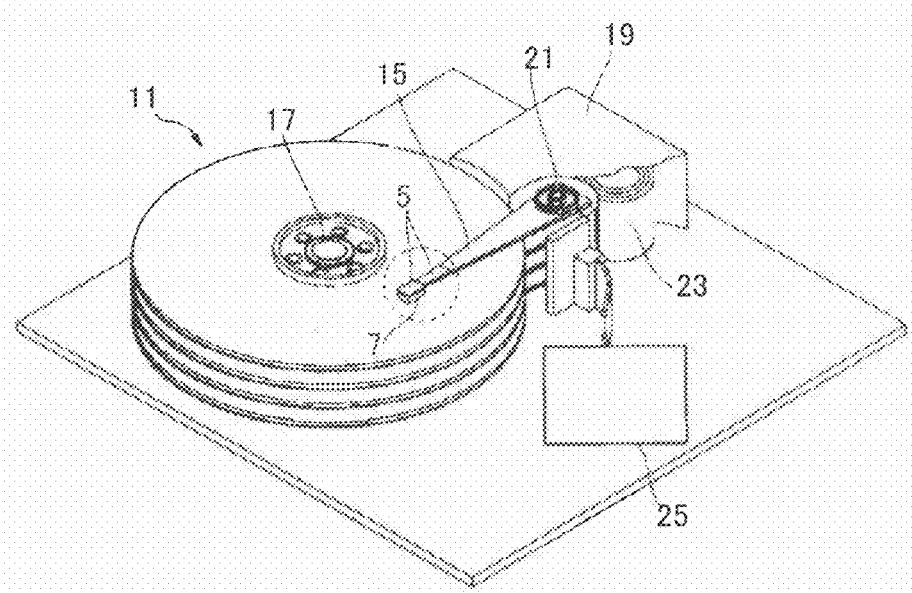
FIG. 15 is a perspective view of a magnetic recording/reproducing apparatus according to the present invention.

FIG. 15 is a perspective view of a magnetic recording/reproducing apparatus. The magnetic recording/reproducing apparatus incorporates the foregoing magnetic recording device, and the present embodiment will be described with a hard disk drive taken as an example. The magnetic recording/reproducing apparatus comprises a plurality of magnetic disks (hard disks) 11 corresponding to a magnetic recording medium M on which information is to be magnetically recorded, a plurality of suspensions 5 disposed for each magnetic disk 11 and supporting the thermally assisted magnetic head 7 at its one end, and a plurality of arms 15 supporting the other end of the suspension 5.

When the magnetic disk 11 rotates for recording or reproducing information, the thermally assisted magnetic head 7 takes off from the recording surface of the magnetic disk 11 utilizing an air flow generated between the recording surface (magnetic head-facing surface) of the magnetic disk 11 and an air bearing surface.

The magnetic disks 11 are rotatable about a spindle motor 17. The arms 15 are connected to an actuator 19 being a power source and are pivotable about a fixed shaft 21. The actuator 19 is constructed to include, for example, a driving source such as a voice coil motor 23.

With the magnetic head device incorporating the thermally assisted magnetic head 7 according to the present invention, as described above, the magnetic recording/reproducing apparatus can record information by applying a recording magnetic field to the magnetic disk 11 and also reproduce information from the magnetic disk 11.

In order to control the recording and reproducing processes, the magnetic recording/reproducing apparatus is further provided with a circuit board for a signal processing circuit 25. The signal processing circuit 25 is electrically connected to the thermally assisted magnetic head 7.

Since the magnetic recording/reproducing apparatus includes the magnetic head and the magnetic head device according to the present invention, the above-described effects of the invention can be obtained.

4. Manufacturing Method

Figure 16:
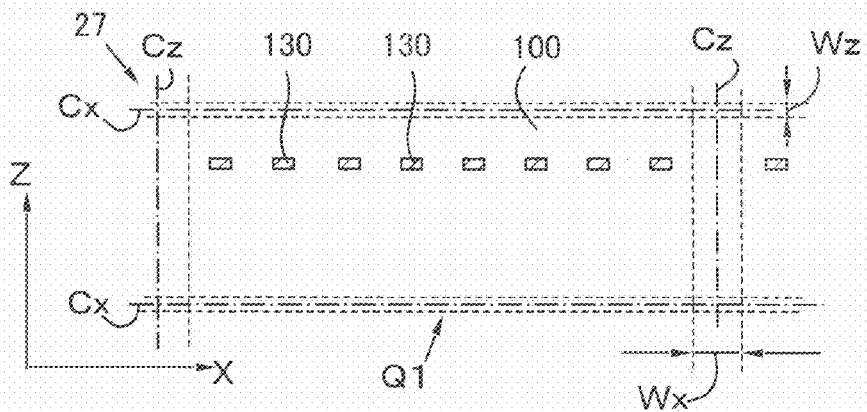
FIG. 16 is a drawing showing a process of manufacturing a thermally assisted magnetic head according to the present invention.

Finally, a method for manufacturing the thermally assisted magnetic head will be described mainly about formation of the groove with reference to FIGS. 16 to 21. At first, as shown in FIG. 16, a wafer 27 is prepared for a final process by further forming the insulating protective film 100, the terminal electrodes 130 and so on after the completion of a process of stacking the recording element, the plasmon generating element, the waveguide, the reproducing element and so on.

Figure 17:
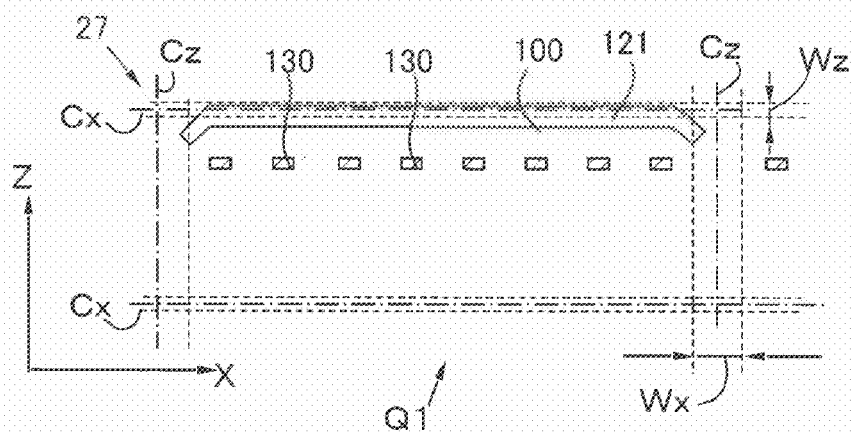
FIG. 17 is a drawing showing a process after the process shown in FIG. 16.

In the wafer 27, the groove 121 is formed as shown in FIG. 17. The groove 121 shown in FIG. 17 has the shape shown in FIGS. 1 and 2. Alternatively, it may be the groove 121 shown in FIGS. 5 and 6. In FIG. 17, assuming that X and Z axes extend in the plane of the wafer 27, it is formed such that as seen in the Z-axis direction, its groove width overlaps with a cutting width Wz to include a cutting centerline Cx along which a large number of thermally assisted magnetic head elements Q1 formed on the wafer 27 are to be cut individually. As seen in the X-axis direction, it is formed such that each end in the X-axis direction is located within a cutting width Wx/2 which occurs on each side of a cutting centerline Cz. Thus, the groove 121 having the shape shown in FIGS. 1 and 2 can be obtained by cutting the wafer 27 along the cutting centerlines Cx, Cz.

Figure 18:
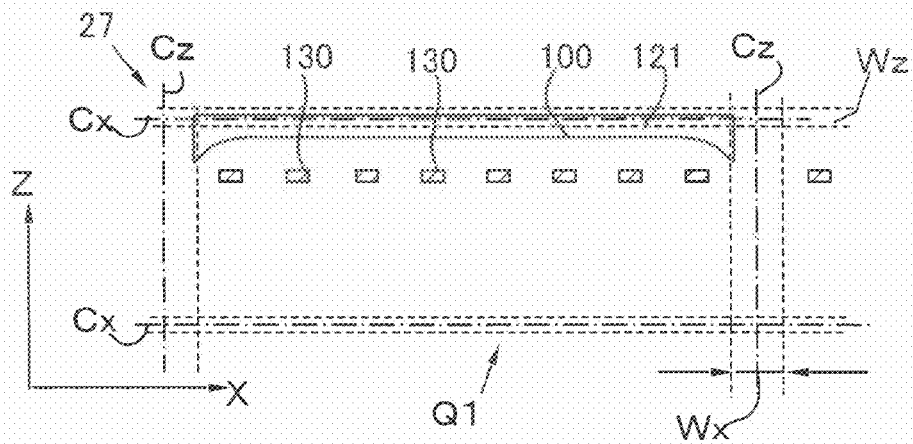
FIG. 18 is a drawing showing another process of manufacturing a thermally assisted magnetic head according to the present invention.
Figure 19:
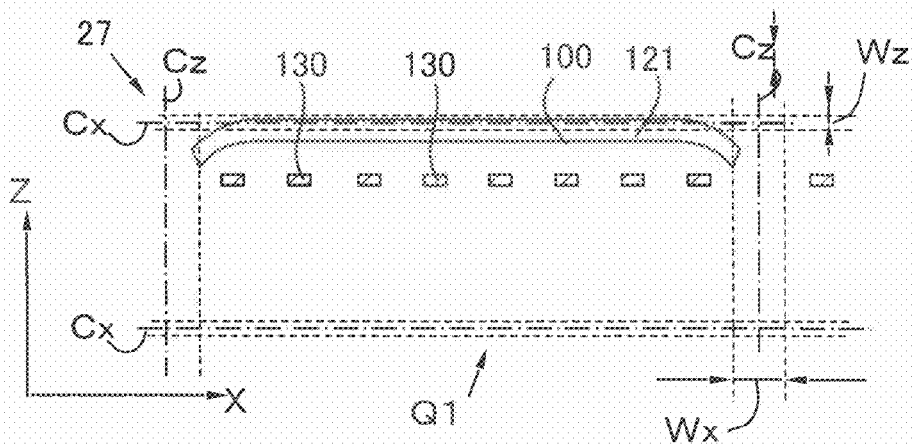
FIG. 19 is a drawing showing still another process of manufacturing a thermally assisted magnetic head according to the present invention.

FIG. 18 is a pattern for obtaining the groove 121 in the shape shown in FIG. 3, while FIG. 19 is a pattern for obtaining the groove 121 in the shape shown in FIG. 4. Relationships between the cutting centerlines Cx, Cz and the cutting widths Wx, Wz and the groove 121 are as described with reference to FIG. 17. Thus, the groove 121 having the shape shown in FIG. 3 or 4 can be obtained by cutting the wafer 27 along the cutting centerlines Cx, Cz. Although description is omitted, the groove shown in FIGS. 5 and 6 can also be formed according to a similar process.

Figure 20:
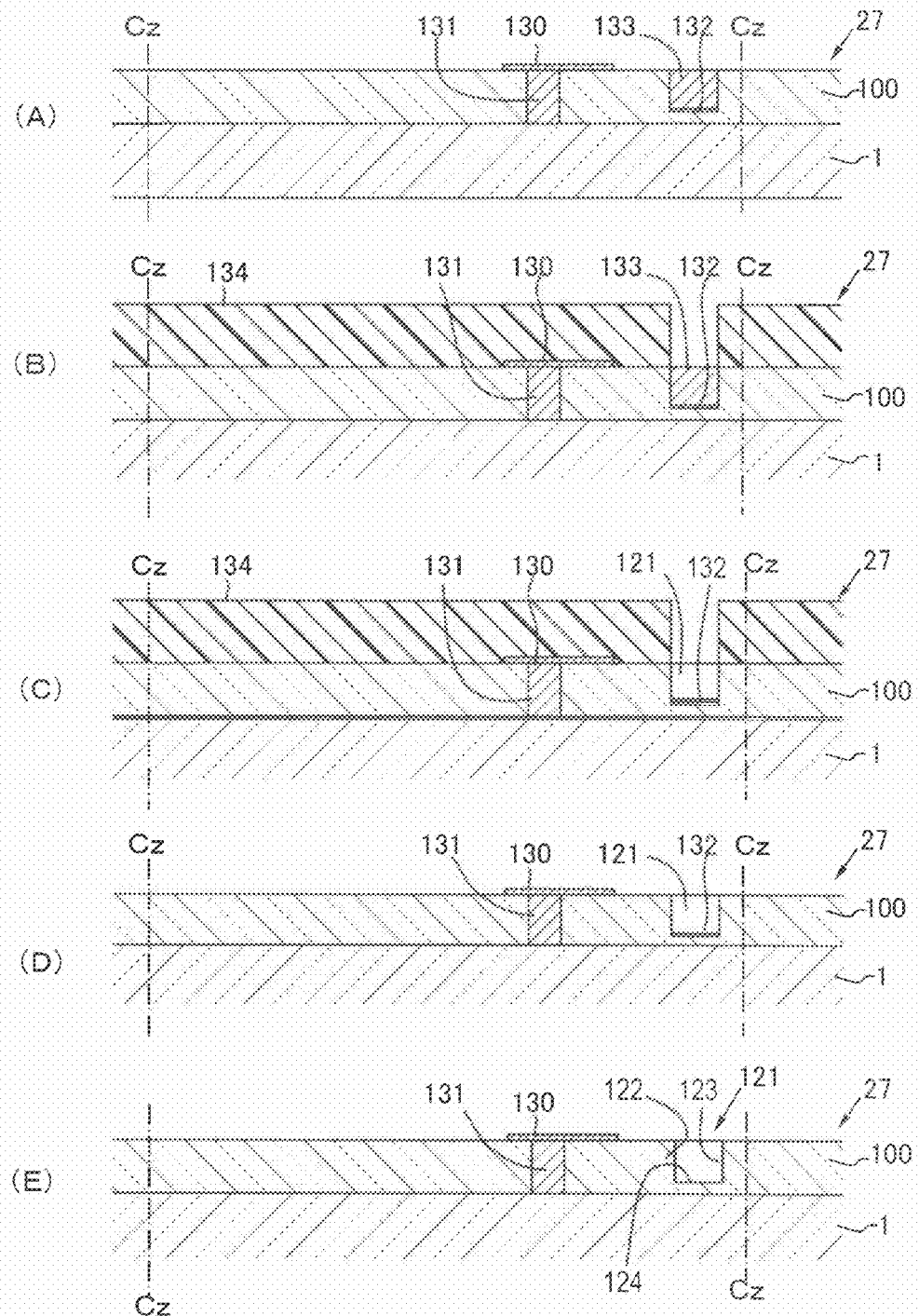
FIG. 20 is a drawing showing a specific process of manufacturing a thermally assisted magnetic head according to the present invention.
Figure 21:
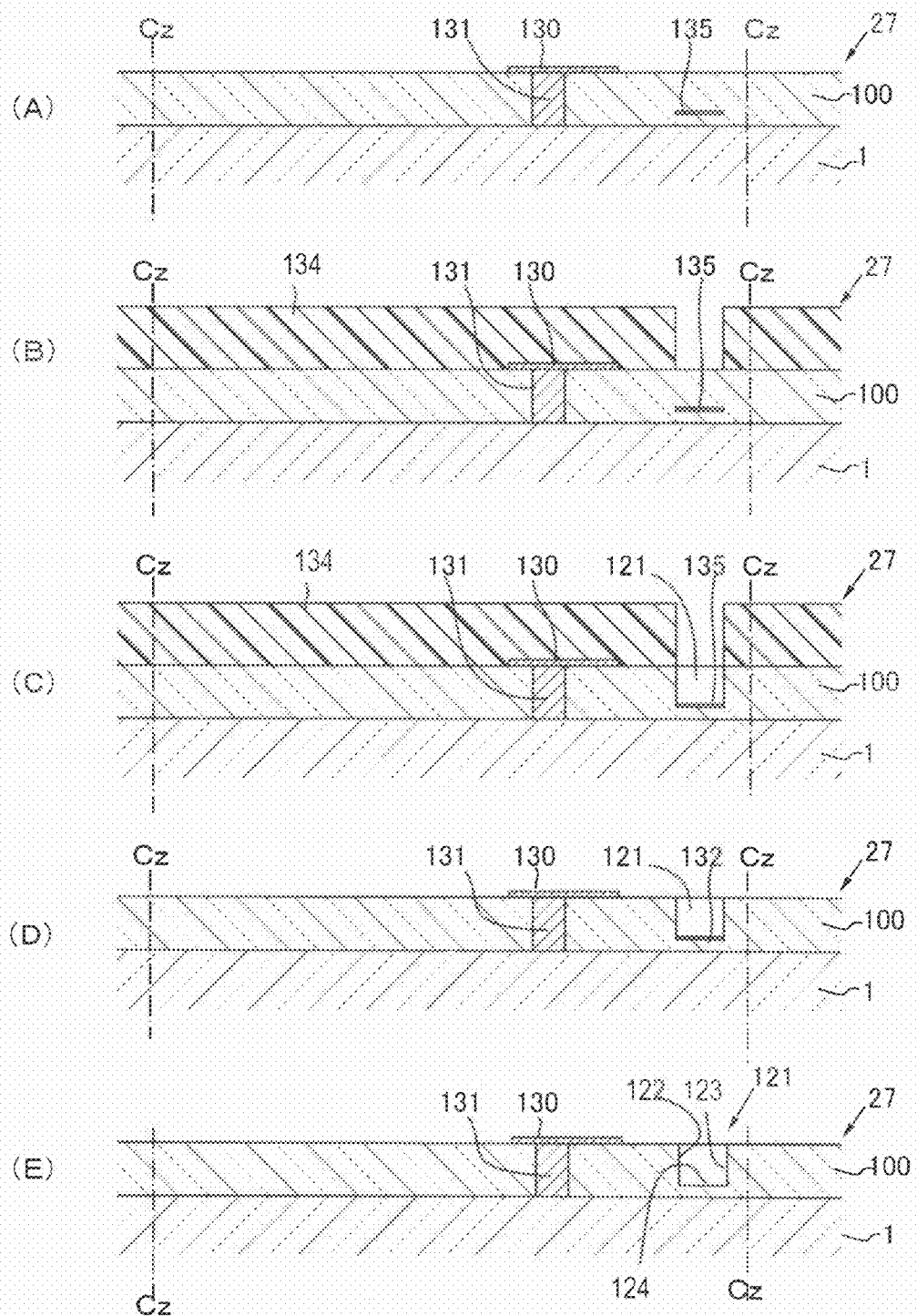
FIG. 21 is a drawing showing another specific process of manufacturing a thermally assisted magnetic head according to the present invention.

A specific process of forming the groove 121 in the wafer 27 will be described below with reference to FIGS. 20 and 21.

At first, description will be made with reference to FIG. 20. As shown in FIG. 20(A), a sacrificial layer 133 according to a groove pattern is formed in the surface of the insulating protective film 100 and within a groove forming area. The sacrificial layer 133 is formed at once by a process of forming an electrode 131 to be located beneath the terminal electrode 130. Preferably, an adhesion layer 132 is formed at a bottom surface of the sacrificial layer 133.

Then, as shown in FIG. 20(B), a photoresist 134 applied to the surface of the insulating protective film 100 is patterned by a photolithography process, thereby forming a cut-out pattern above the sacrificial layer 133.

Then, as shown in FIG. 20(C), the sacrificial layer 133 is removed by chemical etching (wet etching).

Thus, the groove 121 is formed after removal of the sacrificial layer 133, as shown in FIG. 20(D). Then, the groove 121 required is obtained by removing the adhesion layer 132 by means of milling or the like, as shown in FIG. 20(E). Then, the cutting process described with reference to FIGS. 16 to 19 will be performed.

Next, description will be made with reference to FIG. 21. As shown in FIG. 21(A), a stopper layer 135 according to a groove pattern is previously formed inside the insulating protective film 100 and within a groove forming area.

Then, as shown in FIG. 21(B), a photoresist 134 applied to the surface of the insulating protective film 100 is patterned by a photolithography process, thereby forming a cut-out pattern above the stopper layer 135.

Then, as shown in FIG. 21(C), reactive-ion etching (RIE) or chemical etching (wet etching) is performed on the groove forming area of the insulating protective film 100 according to the groove pattern. Etching can be blocked by the stopper layer 135.

Thus, the groove 121 is formed as shown in FIG. 21(D). Then, the groove 121 required is obtained by removing the stopper layer 135 by means of milling or the like, as shown in FIG. 21(E). Then, the cutting process described with reference to FIGS. 16 to 19 will be performed.

The above two processes have the advantage that the groove 121 can be formed as a high-precision pattern by a photolithography process and can be formed in a desired shape, for example, having a curved surface and also that the inner surfaces 122, 123 can be formed to extend substantially vertically from the bottom surface 124. In the case of forming the groove 121 shown in FIGS. 5 and 6, etching should be performed such that the inner wall surface 122, 123 of the groove 121 becomes a slope.

The present invention has been described in detail above with reference to preferred embodiments, but obviously those skilled in the art could easily devise various modifications based on the basic technical concepts underlying the invention and teachings disclosed herein.

What is claimed is:

1. A thermally assisted magnetic head comprising:
   a slider; and
   a light source unit,
   the slider having a groove in a surface of a trailing-side end face for insertion of a suspension, and a recording element, a plasmon generating element, a waveguide, and a reproducing element at one of two opposite ends in a length direction X, wherein an airflow direction in a medium-facing surface of the slider is taken as the length direction X, a direction perpendicular thereto is taken as a width direction Y, and a direction perpendicular to both the length direction X and the width direction Y is taken as a height direction Z, the recording element being disposed adjacent to the plasmon generating element, the waveguide being disposed adjacent to the plasmon generating element, and the light source unit being disposed on a back surface of the slider opposite from the medium-facing surface and having a laser diode chip and a holder, the laser diode chip being supported by the holder and optically connected to the waveguide in the height direction Z.

2. The thermally assisted magnetic head as claimed in claim 1, wherein the groove extends linearly along the width direction Y with bent parts at opposite open ends.

3. The thermally assisted magnetic head as claimed in claim 1, wherein the groove has a corner where a bottom surface and an inner wall surface meet at a certain angle.

4. The thermally assisted magnetic head as claimed in claim 1, wherein the groove is formed by a photolithography process.

5. A magnetic head device comprising;
the thermally assisted magnetic head as claimed in claim 1; and
a suspension,
the suspension having a flexible support, one end of the flexible support being inserted and fixed in the groove of the thermally assisted magnetic head.

6. The magnetic head device as claimed in claim 5, wherein the flexible support has a flexible cable adhered onto a metal substrate, one end of the flexible cable being inserted in the groove.

7. A magnetic recording/reproducing apparatus comprising:
the magnetic head device as claimed in claim 6; and
a magnetic recording medium, the magnetic recording medium being capable of performing magnetic recording or reproducing with the thermally assisted magnetic head of the magnetic head device.

8. A method for manufacturing the thermally assisted magnetic head as claimed in claim 1, comprising the steps of:
forming a sacrificial layer in a groove forming area of the trailing-side end face of the slider according to a groove pattern;
patterning a photoresist applied the surface of the trailing-side end face by a photolithography process, thereby forming a cut-out pattern above the sacrificial layer; and
forming the groove by etching the sacrificial layer.

9. A method for manufacturing the thermally assisted magnetic head as claimed in claim 1, comprising the steps of:
previously forming an etching stopper layer beneath the trailing-side end face of the slider according to a groove pattern;
patterning a photoresist applied to the surface of the trailing-side end face by a photolithography process, thereby forming a cut-out pattern above the etching stopper layer; and
forming the groove by etching a part of the slider at the cut-out pattern.

* * * * *